(12) United States Patent
Li et al.

(10) Patent No.: US 10,798,606 B2
(45) Date of Patent: *Oct. 6, 2020

(54) METHOD AND APPARATUS FOR TRANSMITTING BROADCAST-MULTICAST SINGLE-FREQUENCY NETWORK MEASUREMENT DATA

(71) Applicant: HUAWEI TECHNOLOGIES CO., LTD., Shenzhen, Guangdong (CN)

(72) Inventors: Yuanjie Li, Shanghai (CN); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,677

(22) Filed: Jul. 20, 2018

(65) Prior Publication Data

US 2018/0332499 A1 Nov. 15, 2018

Related U.S. Application Data

(63) Continuation of application No. 15/142,483, filed on Apr. 29, 2016, now Pat. No. 10,064,093, which is a
(Continued)

(51) Int. Cl.
*H04W 28/02* (2009.01)
*H04L 12/18* (2006.01)
*H04W 24/10* (2009.01)

(52) U.S. Cl.
CPC ......... *H04W 28/0289* (2013.01); *H04L 12/18* (2013.01); *H04W 24/10* (2013.01)

(58) Field of Classification Search
CPC ......... H04L 12/18; H04L 47/10; H04L 47/12; H04L 47/14; H04L 47/127; H04L 47/00;
(Continued)

(56) References Cited

U.S. PATENT DOCUMENTS 8,159,997 B2 4/2012 Fukunaga et al.
8,897,234 B2 * 11/2014 Ma .................... H04W 72/0453
370/329
(Continued)

FOREIGN PATENT DOCUMENTS

CN 1486100 A 3/2004
CN 1605164 A 4/2005
(Continued)

OTHER PUBLICATIONS

Motorola "Measurement related corrections", 3GPP Draft; R2-010580, vol. RAN WG2, no. Sophia Antipolis, France; Feb. 21, 2001 XP050117385, 165 pages.
(Continued)

*Primary Examiner* — Tri H Phan
(74) *Attorney, Agent, or Firm* — Slater Matsil, LLP (57) ABSTRACT

Embodiments of the present invention provide a method and an apparatus for transmitting broadcast-multicast single-frequency network measurement data, where second measurement data is acquired by preprocessing acquired first measurement data, and the second measurement data is sent to a base station. Because the second measurement data is obtained after the first measurement data is preprocessed, a size of the second measurement data is smaller than that of the first measurement data, thereby reducing a transmission overhead.

18 Claims, 3 Drawing Sheets

Acquire measurement data according to a preset time window, where the measurement data is a block error rate of data received within the preset time window — S201

Send the measurement data to a base station — S202

Related U.S. Application Data continuation of application No. PCT/CN2013/086284, filed on Oct. 31, 2013.

(58) Field of Classification Search
CPC ...... H04L 47/11; H04L 49/201; H04W 24/10; H04W 28/00; H04W 28/02; H04W 28/0273; H04W 28/0284; H04W 28/0289; H04W 36/22

See application file for complete search history.

(56) References Cited

U.S. PATENT DOCUMENTS

| | | | |
|---|---|---|---|
| 9,277,437 B2 | 3/2016 | Wu | |
| 9,351,128 B2* | 5/2016 | Anchan | H04W 4/06 |
| 9,450,844 B2* | 9/2016 | Cheng | H04L 43/0823 |
| 9,473,967 B2* | 10/2016 | Zhang | H04W 4/06 |
| 9,713,048 B2 | 7/2017 | Jung et al. | |
| 9,832,672 B2* | 11/2017 | Mochizuki | H04W 24/10 |
| 10,027,463 B2* | 7/2018 | Wang | H04L 5/0023 |
| 10,064,093 B2* | 8/2018 | Li | H04W 28/0289 |
| 10,292,018 B2* | 5/2019 | Jung | H04L 12/189 |
| 10,536,199 B2* | 1/2020 | Park | H04W 72/00 |
| 2003/0114179 A1 | 6/2003 | Smolyar et al. | |
| 2008/0220819 A1 | 9/2008 | Ben-Eli | |
| 2010/0034092 A1 | 2/2010 | Krishnamurthy et al. | |
| 2010/0284286 A1 | 11/2010 | Bourdeaut | |
| 2012/0044850 A1* | 2/2012 | Wang | H04W 72/005 370/312 |
| 2013/0053017 A1 | 2/2013 | Chang | |
| 2013/0128756 A1 | 5/2013 | Zhang et al. | |
| 2014/0064133 A1 | 3/2014 | Kazmi et al. | |
| 2014/0098761 A1 | 4/2014 | Lee et al. | |
| 2015/0092554 A1 | 4/2015 | Mochizuki et al. | |
| 2015/0318973 A1 | 11/2015 | Wang et al. | |
| 2015/0373507 A1 | 12/2015 | Jung et al. | |
| 2016/0218816 A1 | 7/2016 | Horiuchi et al. | |
| 2016/0278102 A1* | 9/2016 | Bontu | H04L 1/20 |

FOREIGN PATENT DOCUMENTS

| | | |
|---|---|---|
| CN | 101123457 A | 2/2008 |
| CN | 101686476 A | 3/2010 |
| CN | 101925006 A | 12/2010 |
| CN | 102119562 A | 7/2011 |
| CN | 102457883 A | 5/2012 |
| CN | 103347298 A | 10/2013 |
| EP | 2106181 A2 | 9/2009 |

OTHER PUBLICATIONS

Qualcomm Incorporated "Initial MBSFN measurement evaluation", 3GPP Draft; R1-134615, vol. RAN WG1, no. Guangzhou, China; Sep. 28, 2013, XP050717700, 7 pages.

Extended European Search Report dated Apr. 3, 2019 in corresponding European Patent Application No. 18198292.7 (12 pages).

Office Action, dated Oct. 18, 2017, in U.S. Appl. No. 15/142,483 (10 pp.).

Notice of Allowance, dated Apr. 23, 2018, in U.S. Appl. No. 15/142,483 (9 pp.).

International Search Report, dated Jul. 29, 2014, in International Application No. PCT/CN2013/086284 (8 pp.).

Written Opinion of the International Searching Authority, dated Jul. 29, 2014, in International Application No. PCT/CN2013/086284 (9 pp.).

Partial Supplementary European Search Report dated Sep. 21, 2016 in corresponding European Patent Application No. 13896729.4 (9 pp.).

Samsung, "Coverage optimization for Rel-11 MDT," 3GPP TSG RAN WG2 #75bis, R2-115052, Oct. 10-14, 2011, Zhuhai, China, pp. 1-2.

Huawei et al., "Discussion on UE measurements for MBMS," 3GPP TSG RAN WG1 Meeting #74bis, R1-134351, Guangzhou, China, Oct. 7-11, 2013, pp. 1-4.

U.S. Appl. No. 15/142,483, filed Apr. 29, 2016, Li et al., Huawei Technologies Co., Ltd.

* cited by examiner

METHOD AND APPARATUS FOR TRANSMITTING BROADCAST-MULTICAST SINGLE-FREQUENCY NETWORK MEASUREMENT DATA

CROSS-REFERENCE TO RELATED APPLICATIONS

This application is a continuation of U.S. patent application Ser. No. 15/142,483, filed on Apr. 29, 2016, which is a continuation of International Application No. PCT/CN2013/086284, filed on Oct. 31, 2013. The afore-mentioned patent applications are hereby incorporated by reference in their entireties.

TECHNICAL FIELD

Embodiments of the present invention relate to communications technologies, and in particular, to a method and an apparatus for transmitting broadcast-multicast single-frequency network measurement data.

BACKGROUND

A multimedia broadcast multicast service (MBMS) supports two modes, namely, a multimedia broadcast service and a multicast service, and is normally propagated in a form of a broadcast-multicast single-frequency network (Multicast Broadcast Single Frequency Network, hereinafter referred to as MBSFN for short). Propagation in this form requires cells that belong to a same MBSFN area to simultaneously send an identical signal, so that a UE receiver can consider all cells within a MBSFN area as one macro equivalent cell; and therefore, the UE does not encounter inter-cell interference of neighboring cell transmission, but benefits from overlapping of signals from a plurality of cells within the same MBSFN area, thereby improving received signal quality.

In order to better implement network optimization, an MBSFN measurement parameter needs to be acquired by drive testing to configure a cell and configure a proper modulation and coding scheme (Modulation Coding Scheme, hereinafter referred to as MCS for short) for MBMS transmission, where the MBSFN measurement parameter may be an MBSFN reference signal received power (Reference Signal Receiving Power, hereinafter referred to as RSRP for short), MBSFN reference signal received quality (Reference Signal Receiving Quality, hereinafter referred to as RSRQ for short), an MBSFN channel quality indicator (CQI), or the like.

However, reporting a large number of measurement parameters increases a transmission overhead.

SUMMARY

Embodiments of the present invention provide a method and an apparatus for transmitting broadcast-multicast single-frequency network measurement data, so as to reduce a transmission overhead.

A first aspect of the embodiments of the present invention provides a method for transmitting broadcast-multicast single-frequency network measurement data, and the method includes:

acquiring first measurement data, where the first measurement data includes M measured values, and the M measured values are measured values of a same broadcast-multicast single-frequency network MBSFN measurement parameter, where M is an integer greater than or equal to 2;

preprocessing the first measurement data to acquire second measurement data, where a size of the second measurement data is smaller than that of the first measurement data; and sending the second measurement data to a base station.

With reference to the first aspect, in a first possible implementation manner, the preprocessing the first measurement data to acquire second measurement data includes:

determining one measured value of the M measured values as a first measured value;

acquiring M−1 differences, where the M−1 differences are differences respectively between M−1 measured values except the first measured value of the first measurement data and the first measured value; and determining the first measured value and the M−1 differences as the second measurement data.

With reference to the first aspect, in a second possible implementation manner, the preprocessing the first measurement data to acquire second measurement data includes:

acquiring differences between two consecutive measured values one by one according to a sequence of the M measured values, where a quantity of the differences is M−1, and a difference between two consecutive measured values is a difference acquired by subtracting a next measured value from a previous measured value or a difference acquired by subtracting a previous measured value from a next measured value; and determining, according to the sequence of the M measured values, the first measured value of the M measured values and the M−1 differences as the second measurement data.

With reference to the first aspect, in a third possible implementation manner, the preprocessing the first measurement data to acquire second measurement data includes:

acquiring, according to a nature of the measurement parameter, N worst measured values of the M measured values as the second measurement data, where N is an integer greater than or equal to 1 and smaller than or equal to M.

With reference to the first aspect, in a fourth possible implementation manner, the preprocessing the first measurement data to acquire second measurement data includes:

acquiring, according to a nature of the measurement parameter, an average value of N worst measured values of the M measured values as the second measurement data, where N is an integer greater than or equal to 1 and smaller than or equal to M.

With reference to the third possible implementation manner or the fourth possible implementation manner, in a fifth implementation manner, N is a preset value, or a value that is set by using signaling.

With reference to the first aspect, in a sixth possible implementation manner, the preprocessing the first measurement data to acquire second measurement data includes:

determining, according to ranges of R preset intervals, a quantity of measured values in each preset interval of the M measured values, where R is an integer greater than or equal to 1; and determining the quantity of the measured values in each preset interval as the second measurement data.

With reference to the first aspect, in a seventh possible implementation manner, the preprocessing the first measurement data to acquire second measurement data includes:

determining, according to ranges of R preset intervals, a ratio of a quantity of measured values in each preset interval of the M measured values to M; and determining the ratio of the quantity of the measured values in each preset interval to M as the second measurement data.

With reference to the first aspect, in an eighth possible implementation manner, the preprocessing the first measurement data to acquire second measurement data includes:

determining, according to ranges of R preset intervals, an average value and/or a variance of measured values in each preset interval of the M measured values; and determining the average value and/or the variance of the measured values in each preset interval as the second measurement data.

With reference to any one possible implementation manner of the sixth to the eighth possible implementation manners, in a ninth possible implementation manner, the preset intervals are intervals that are set according to a value range of the measured values.

With reference to any one possible implementation manner of the sixth to the eighth possible implementation manners, in a tenth possible implementation manner, R is a preset value, or a value that is set by using signaling.

With reference to the first aspect, in an eleventh possible implementation manner, the preprocessing the first measurement data to acquire second measurement data includes:

determining an average value and/or a variance of the M measured values of the first measurement data; and determining the average value and/or the variance of the M measured values as the second measurement data.

With reference to the first aspect, in a twelfth possible implementation manner, the preprocessing the first measurement data to acquire second measurement data includes:

determining, according to W preset time windows, an average value and/or a variance of measured values within each preset time window, where W is an integer greater than or equal to 1; and determining the average value and/or the variance of the measured values within each preset time window as the second measurement data.

With reference to the twelfth possible implementation manner, in a thirteenth possible implementation manner, the preset time window is predefined duration, or duration that is set by using signaling.

A second aspect of the embodiments of the present invention provides a method for transmitting broadcast-multicast single-frequency network measurement data, and the method includes:

acquiring measurement data according to a preset time window, where the measurement data is a block error rate of data received within the preset time window; and sending the measurement data to a base station, so that the base station performs network optimization and/or coding and modulation for broadcast multicast service MBMS sending according to the measurement data.

With reference to the second aspect, in a first possible implementation manner, the preset time window is predefined duration, or duration that is set by using signaling.

A third aspect of the embodiments of the present invention provides a method for transmitting broadcast-multicast single-frequency network measurement data, and the method includes:

receiving second measurement data sent by a user equipment UE, where the second measurement data is measurement data acquired by the UE by preprocessing acquired first measurement data, the first measurement data includes M measured values, and the M measured values are measured values of a same broadcast-multicast single-frequency network MBSFN measurement parameter, where M is an integer greater than or equal to 2, and a size of the second measurement data is smaller than that of the first measurement data; and performing network optimization and/or coding and modulation for broadcast multicast service MBMS sending according to the second measurement data.

A fourth aspect of the embodiments of the present invention provides a method for transmitting broadcast-multicast single-frequency network measurement data, and the method includes:

receiving measurement data sent by a UE, where the measurement data is a block error rate of data received by the UE within a preset time window; and performing network optimization and/or coding and modulation for broadcast multicast service MBMS sending according to the measurement data.

A fifth aspect of the embodiments of the present invention provides an apparatus for transmitting broadcast-multicast single-frequency network measurement data, and the apparatus includes:

an acquiring module, configured to acquire first measurement data, where the first measurement data includes M measured values, and the M measured values are measured values of a same broadcast-multicast single-frequency network MBSFN measurement parameter, where M is an integer greater than or equal to 2;

a processing module, configured to preprocess the first measurement data to acquire second measurement data, where a size of the second measurement data is smaller than that of the first measurement data; and a sending module, configured to send the second measurement data to a base station.

With reference to the fifth aspect, in a first possible implementation manner, the processing module is specifically configured to determine one measured value of the M measured values as a first measured value; acquire M−1 differences, where the M−1 differences are differences respectively between M−1 measured values except the first measured value of the first measurement data and the first measured value; and determine the first measured value and the M−1 differences as the second measurement data.

With reference to the fifth aspect, in a second possible implementation manner, the processing module is specifically configured to acquire differences between two consecutive measured values one by one according to a sequence of the M measured values, where a quantity of the differences is M−1, and a difference between two consecutive measured values is a difference acquired by subtracting a next measured value from a previous measured value or a difference acquired by subtracting a previous measured value from a next measured value; and determine, according to the sequence of the M measured values, the first measured value of the M measured values and the M−1 differences as the second measurement data.

With reference to the fifth aspect, in a third possible implementation manner, the processing module is specifically configured to acquire, according to a nature of the measurement parameter, N worst measured values of the M measured values as the second measurement data, where N is an integer greater than or equal to 1 and smaller than or equal to M.

With reference to the fifth aspect, in a fourth possible implementation manner, the processing module is specifically configured to acquire, according to a nature of the measurement parameter, an average value of N worst measured values of the M measured values as the second measurement data, where N is an integer greater than or equal to 1 and smaller than or equal to M.

With reference to the third or the fourth possible implementation manner, in a fifth possible implementation manner, N is a preset value, or a value that is set by using signaling.

With reference to the fifth aspect, in a sixth possible implementation manner, the processing module is specifically configured to determine, according to ranges of R preset intervals, a quantity of measured values in each preset interval of the M measured values, where R is an integer greater than or equal to 1; and determine the quantity of the measured values in each preset interval as the second measurement data.

With reference to the fifth aspect, in a seventh possible implementation manner, the processing module is specifically configured to determine, according to ranges of R preset intervals, a ratio of a quantity of measured values in each preset interval of the M measured values to M; and determine the ratio of the quantity of the measured values in each preset interval to M as the second measurement data.

With reference to the fifth aspect, in an eighth possible implementation manner, the processing module is specifically configured to determine, according to ranges of R preset intervals, an average value and/or a variance of measured values in each preset interval of the M measured values; and determine the average value and/or the variance of the measured values in each preset interval as the second measurement data.

With reference to any one possible implementation manner of the sixth to the eighth possible implementation manners, in a ninth possible implementation manner, the preset intervals are intervals that are set according to a value range of the measured values.

With reference to any one possible implementation manner of the sixth to the ninth possible implementation manners, in a tenth possible implementation manner, R is a preset value, or a value that is set by using signaling.

With reference to the fifth aspect, in an eleventh possible implementation manner, the processing module is specifically configured to determine an average value and/or a variance of the M measured values of the first measurement data; and determine the average value and/or the variance of the M measured values as the second measurement data.

With reference to the fifth aspect, in a twelfth possible implementation manner, the processing module is specifically configured to determine, according to W preset time windows, an average value and/or a variance of measured values within each preset time window, where W is an integer greater than or equal to 1; and determine the average value and/or the variance of the measured values within each preset time window as the second measurement data.

With reference to the twelfth possible implementation manner, in a thirteenth possible implementation manner, the preset time window is predefined duration, or duration that is set by using signaling.

A sixth aspect of the embodiments of the present invention provides an apparatus for transmitting broadcast-multicast single-frequency network measurement data, and the apparatus includes:

an acquiring module, configured to acquire measurement data according to a preset time window, where the measurement data is a block error rate of data received within the preset time window, where the preset time window is predefined duration, or duration that is set by using signaling; and a sending module, configured to send the measurement data to a base station, so that the base station performs network optimization and/or coding and modulation for broadcast multicast service MBMS sending according to the measurement data.

With reference to the sixth aspect, in a first possible implementation manner, the preset time window is predefined duration, or duration that is set by using signaling.

A seventh aspect of the embodiments of the present invention provides an apparatus for transmitting broadcast-multicast single-frequency network measurement data, and the apparatus includes:

a receiving module, configured to receive second measurement data sent by a user equipment UE, where the second measurement data is measurement data acquired by the UE by preprocessing acquired first measurement data, the first measurement data includes M measured values, and the M measured values are measured values of a same broadcast-multicast single-frequency network MBSFN measurement parameter, where M is an integer greater than or equal to 2, and a size of the second measurement data is smaller than that of the first measurement data; and a processing module, configured to perform network optimization and/or coding and modulation for broadcast multicast service MBMS sending according to the second measurement data.

An eighth aspect of the embodiments of the present invention provides an apparatus for transmitting broadcast-multicast single-frequency network measurement data, and the apparatus includes:

a receiving module, configured to receive measurement data sent by a UE, where the measurement data is a block error rate of data received by the UE within a preset time window; and a processing module, configured to perform network optimization according to the measurement data.

A ninth aspect of the embodiments of the present invention provides an apparatus for transmitting broadcast-multicast single-frequency network measurement data, and the apparatus includes:

an acquirer, configured to acquire first measurement data, where the first measurement data includes M measured values, and the M measured values are measured values of a same broadcast-multicast single-frequency network MBSFN measurement parameter, where M is an integer greater than or equal to 2;

a processor, configured to preprocess the first measurement data to acquire second measurement data, where a size of the second measurement data is smaller than that of the first measurement data; and a sender, configured to send the second measurement data to a base station.

With reference to the ninth aspect, in a first possible implementation manner, the processor is specifically configured to determine one measured value of the M measured values as a first measured value; acquire M−1 differences, where the M−1 differences are differences respectively between M−1 measured values except the first measured value of the first measurement data and the first measured value; and determine the first measured value and the M−1 differences as the second measurement data.

With reference to the ninth aspect, in a second possible implementation manner, the processor is specifically configured to acquire differences between two consecutive measured values one by one according to a sequence of the M measured values, where a quantity of the differences is M−1, and a difference between two consecutive measured values is a difference acquired by subtracting a next measured value from a previous measured value or a difference acquired by subtracting a previous measured value from a next measured value; and determine, according to the sequence of the M measured values, the first measured value of the M measured values and the M−1 differences as the second measurement data.

With reference to the ninth aspect, in a third possible implementation manner, the processor is specifically configured to acquire, according to a nature of the measurement parameter, N worst measured values of the M measured values as the second measurement data, where N is an integer greater than or equal to 1 and smaller than or equal to M.

With reference to the ninth aspect, in a fourth possible implementation manner, the processor is specifically configured to acquire, according to a nature of the measurement parameter, an average value of N worst measured values of the M measured values as the second measurement data, where N is an integer greater than or equal to 1 and smaller than or equal to M.

With reference to the third possible implementation manner or the fourth possible implementation manner, in a fifth implementation manner, N is a preset value, or a value that is set by using signaling.

With reference to the ninth aspect, in a sixth possible implementation manner, the processor is specifically configured to determine, according to ranges of R preset intervals, a quantity of measured values in each preset interval of the M measured values, where R is an integer greater than or equal to 1; and determine the quantity of the measured values in each preset interval as the second measurement data.

With reference to the ninth aspect, in a seventh possible implementation manner, the processor is specifically configured to determine, according to ranges of R preset intervals, a ratio of a quantity of measured values in each preset interval of the M measured values to M; and determine the ratio of the quantity of the measured values in each preset interval to M as the second measurement data.

With reference to the ninth aspect, in an eighth possible implementation manner, the processor is specifically configured to determine, according to ranges of R preset intervals, an average value and/or a variance of measured values in each preset interval of the M measured values; and determine the average value and/or the variance of the measured values in each preset interval as the second measurement data.

With reference to any one possible implementation manner of the sixth to the eighth possible implementation manners, in a ninth possible implementation manner, the preset intervals are intervals that are set according to a value range of the measured values.

With reference to any one possible implementation manner of the sixth to the eighth possible implementation manners, in a tenth possible implementation manner, R is a preset value, or a value that is set by using signaling.

With reference to the ninth aspect, in an eleventh possible implementation manner, the processor is specifically configured to determine an average value and/or a variance of the M measured values of the first measurement data; and determine the average value and/or the variance of the M measured values as the second measurement data.

With reference to the ninth aspect, in a twelfth possible implementation manner, the processor is specifically configured to determine, according to W preset time windows, an average value and/or a variance of measured values within each preset time window, where W is an integer greater than or equal to 1; and determine the average value and/or the variance of the measured values within each preset time window as the second measurement data.

With reference to the twelfth possible implementation manner, in a thirteenth possible implementation manner, the preset time window is predefined duration, or duration that is set by using signaling.

A tenth aspect of the embodiments of the present invention provides an apparatus for transmitting broadcast-multicast single-frequency network measurement data, and the apparatus includes:
an acquirer, configured to acquire measurement data according to a preset time window, where the measurement data is a block error rate of data received within the preset time window; and
a sender, configured to send the measurement data to a base station, so that the base station performs network optimization according to the measurement data.

With reference to the tenth aspect, in a first possible implementation manner, the preset time window is predefined duration, or duration that is set by using signaling.

An eleventh aspect of the embodiments of the present invention provides an apparatus for transmitting broadcast-multicast single-frequency network measurement data, and the apparatus includes:
a receiver, configured to receive second measurement data sent by a user equipment UE, where the second measurement data is measurement data acquired by the UE by preprocessing acquired first measurement data, the first measurement data includes M measured values, and the M measured values are measured values of a same broadcast-multicast single-frequency network MBSFN measurement parameter, where M is an integer greater than or equal to 2, and a size of the second measurement data is smaller than that of the first measurement data; and
a processor, configured to perform network optimization and/or coding and modulation for broadcast multicast service MBMS sending according to the second measurement data.

A twelfth aspect of the embodiments of the present invention provides an apparatus for transmitting broadcast-multicast single-frequency network measurement data, and the apparatus includes:
a receiver, configured to receive measurement data sent by a UE, where the measurement data is a block error rate of data received by the UE within a preset time window; and
a processor, configured to perform network optimization and/or coding and modulation for broadcast multicast service MBMS sending according to the measurement data.

According to a method and an apparatus for transmitting broadcast-multicast single-frequency network measurement data provided in embodiments of the present invention, second measurement data is acquired by preprocessing acquired first measurement data, and the second measurement data is sent to a base station. Because the second measurement data is obtained after the first measurement data is preprocessed, a size of the second measurement data is smaller than that of the first measurement data, thereby reducing a transmission overhead.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The main idea of the present invention is to transmit a difference relationship or a distribution relationship between M measured values for the M measured values of a same MBSFN measurement parameter, so as to reduce a transmission overhead.

The following describes the technical solution of the present invention in detail by using specific embodiments.

Figure 1:
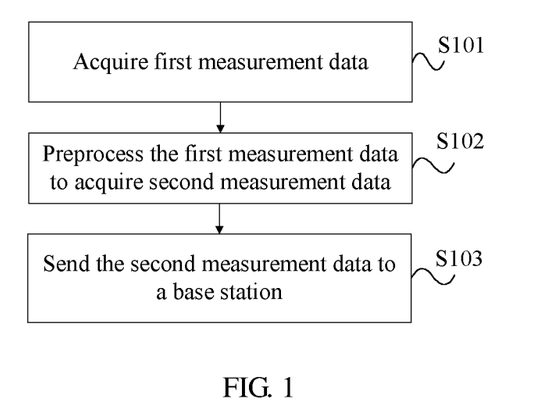
FIG. 1 is a schematic flowchart of Embodiment 1 of a method for transmitting MBSFN measurement data according to the present invention.

FIG. 1 is a schematic flowchart of Embodiment 1 of a method for transmitting MBSFN measurement data according to the present invention. This embodiment is executed by a user equipment (UE). As shown in FIG. 1, the method according to this embodiment includes:

S101: Acquire first measurement data.

The first measurement data includes M measured values, and the M measured values are measured values of a same MBSFN measurement parameter, where M is an integer greater than or equal to 2, and the measurement parameter may be an MBSFN RSRP, MBSFN RSRQ, an MBSFN CQI, or the like. The measured values of the same measurement parameter refer to M measured values that is acquired when a measurement parameter is measured, for example, when the MBSFN RSRQ is measured, where the M measured values are all referred to as measured values of the MBSFN RSRQ.

The M measured values may be M measured values obtained for a measurement parameter within preset duration, M measured values obtained for a measurement parameter in a same position, or M measured values corresponding to position information for a measurement parameter.

S102: Preprocess the first measurement data to acquire second measurement data.

A size of the second measurement data is smaller than that of the first measurement data. The size of the second measurement data or the first measurement data herein refers to a quantity of bits occupied by measurement data.

S103: Send the second measurement data to a base station.

In this embodiment, the second measurement data is acquired by preprocessing the acquired first measurement data, and the second measurement data is sent to the base station. Because the second measurement data is obtained after the first measurement data is preprocessed, the size of the second measurement data is smaller than that of the first measurement data, thereby reducing a transmission overhead.

In the embodiment, step S102 includes but is not limited to the following multiple implementation manners:

First implementation manner: Determine one measured value of the M measured values as a first measured value; then, acquire M−1 differences, where the M−1 differences are differences respectively between M−1 measured values except the first measured value of the first measurement data and the first measured value; and determine the first measured value and the M−1 differences of the first measured value as the second measurement data. For example, M is 4, the measurement parameter is an MBSFN CQI, and 4 measured values are separately 12, 13, 14, and 15; when the first implementation manner is used, a first measured value is determined to be 12, and 3 differences are differences between 13 and 12, 14 and 12, and between 15 and 12 respectively, which are 1, 2, and 3 respectively. Accordingly, the second measurement data includes 12, 1, 2, and 3. Because 1, 2, and 3 are smaller than 13, 14, and 15, fewer transmission bits are occupied. In other words, in the first implementation manner, differences between measured values and a fixed measured value are used to replace the measured values for transmission, so as to reduce a transmission overhead. After receiving second measurement value data, the base station may restore the first measurement data according to the second measurement data, and perform network optimization and/or coding and modulation for MBMS sending according to the first measurement data.

Second implementation manner: Acquiring differences between two consecutive measured values one by one according to a sequence of the M measured values, where a quantity of the differences is M−1, and a difference between two consecutive measured values is a difference acquired by subtracting a next measured value from a previous measured value or a difference acquired by subtracting a previous measured value from a next measured value; and determine, according to the sequence of the M measured values, the first measured value of the M measured values and the M−1 differences as the second measurement data. For example, M is 4, the measurement parameter is an MBSFN CQI, and 4 measured values are separately 12, 13, 14, and 15; when the second implementation manner is used, M measured values of the first measurement data are sorted in order, where the sorting may be sorting in any manner as long as a position of each measured value in a sequence can be distinguished. For example, a sequence is 12, 13, 14, 15. Accordingly, a difference between a next measured value and a previous measured value is acquired one by one according to the sequence of the M measured values, where differences are 1, 1, and 1 respectively; the second measurement data includes 12, 1, 1, and 1. Because 1, 1, and 1 are smaller than 13, 14, and 15, fewer transmission bits are occupied. In other words, in the second implementation manner, the differences between the measured values and a previous measured value are used to replace the measured values for transmission, so as to reduce a transmission overhead. Certainly, it may be understood that the difference may also be a difference acquired by subtracting a next measured value from a previous measured value, for example, the second measurement data includes 12, −1, −1, and −1, which is not limited in the present invention. After receiving the second measurement data, the base station may restore the first measurement data according to the second measurement data, and perform network optimization and/or coding and modulation for MBMS sending according to the first measurement data.

The second measurement data in the first implementation manner and the second implementation manner may be reported to the base station at one time, or may be reported to the base station at a plurality of times, for example, be reported at two times. For the first implementation manner, 12 and 1 are reported for the first time, and 2 and 3 are reported for the second time; and for the second implementation manner, 12 and −1 are reported for the first time, and −1 and −1 are reported for the second time.

Third implementation manner: Acquire, according to a nature of the measurement parameter, N worst measured values of the M measured values as the second measurement data, where N is an integer greater than or equal to 1 and smaller than or equal to M. When MBSFN network optimization is performed, measured values in an adverse environment are normally of more concern. Therefore, optimization deployment is performed according to the measured values in the adverse environment. For example, measured values of an MBSFN SINR, an MBSFN CQI, and an MBSFN BLER are used to configure an MCS of an MBSFN. Therefore, network optimization is generally performed according to a measured value of worse quality. For the MBSFN SINR, a smaller measured value indicates worse quality; for the MBSFN CQI, a smaller value indicates worse quality; and for the MBSFN BLER, a larger value indicates worse quality. In this embodiment, instead of reporting all measured values, the UE reports N worst measured values that play an important role in network optimization, so as to reduce a transmission overhead.

Fourth implementation manner: A difference between the fourth implementation manner and the third implementation manner lies in that, in the third implementation manner, the second measurement data includes the N worst measured values; however, in the fourth implementation manner, the second measurement data includes an average value of the N worst measured values, and because severity of a network environment may be reflected by using the average value, the base station may perform network optimization according to the average value. In this embodiment, instead of reporting all measured values, the UE reports the average value of the N worst measured values that play an important role in network optimization, so as to further reduce a transmission overhead.

In the third or fourth implementation manner, a value of N may be a preset value, for example, a value specified in a protocol, or a value set by a network side by using signaling and received by the UE.

Fifth implementation manner: Set R preset intervals according to a value range of measured values; determine, according to ranges of the R preset intervals, a quantity of measured values in each preset interval of the M measured values, where R is an integer greater than or equal to 1; and determine the quantity of the measured values in each preset interval as the second measurement data. For example, table 1 is a measured value distribution table.

| Preset interval | Quantity |
| --- | --- |
| Below −4 dB | N1 |
| −4 dB to 0 dB | N2 |
| 0 dB to 4 dB | N3 |
| Over 4 dB | N4 |

N1+N2+N3+N4=M. Because the second measurement data includes the quantity of the measured values in each preset interval, a transmission overhead may be reduced, and the base station may perform network optimization and/or coding and modulation for MBMS sending according to the quantity of the measured values distributed in each preset interval.

Sixth implementation manner: A difference between the sixth implementation manner and the fifth implementation manner lies in that, in the fifth implementation manner, the second measurement data includes the quantity of the measured values in each preset interval; however, in the sixth implementation manner, the second measurement data includes a ratio of the quantity of the measured values in each preset interval to M, that is, a distribution condition of measured values is represented in a percentage form, so that the base station performs network optimization and/or coding and modulation for MBMS sending according to the quantity of the measured values distributed in each preset interval.

Seventh implementation manner: A difference between the seventh implementation manner and the fifth implementation manner lies in that, in the fifth implementation manner, the second measurement data includes the quantity of the measured values in each preset interval; however, in the seventh implementation manner, the second measurement data includes an average value and/or a variance of the measured values in each preset interval, and the base station may learn an average size of the measured values according to the average value and learn a fluctuation degree of the measured values in each preset interval according to the variance, so as to perform network optimization according to the average value and/or the variance of the measured values in each preset interval. In this embodiment, instead of reporting all measured values, the UE reports the average value and/or the variance of the measured values in each preset interval, so as to reduce a transmission overhead.

In the foregoing fifth, sixth, or seventh implementation manner, the preset intervals are intervals that are set according to a value range of the measured values. For example, the value range of the measured values is −5 dB to 5 dB, and preset intervals, as shown in table 1, may be set to be below −4 dB, −4 dB to 0 dB, 0 dB to 4 dB, and over 4 dB respectively. The number R of the preset intervals is a preset value, for example, a value specified by a protocol, or a value set by a network side by using signaling and received by the UE.

Eighth implementation manner: Determine an average value and/or a variance of the M measured values of the first measurement data, and determine the average value and the variance of the M measured values as the second measurement data. That is, the UE reports only the average value and/or the variance of the M measured values to the base station; the base station may learn a distribution condition of the M measured values according to the average value and the variance of the M measured values, and perform network optimization according to the average value and/or the variance. In this embodiment, instead of reporting all measured values, the UE reports the average value and/or the variance of the M measured values, so as to reduce a transmission overhead.

Ninth implementation manner: Determine, according to W preset time windows and a time when each measured value of the M measured values is acquired, an average value and/or a variance of measured values within each preset time window, where W is an integer greater than or equal to 1; and determine the average value and/or the variance of the measured values within each preset time window as the second measurement data. In other words, the average value and the variance of the measured values of which the time for acquiring the measured value are within the preset time window are determined as the second measurement data. This implementation manner can reduce a transmission overhead, and more accurately reflect a distribution change of the measured values along with time, so as to determine a quality change of a channel along with time and perform network optimization and/or coding and modulation for MBMS sending more accurately.

In the ninth implementation manner, the preset time window is predefined duration, for example, duration specified in a protocol, or duration set by a network side by using signaling and received by the UE.

Figure 2:
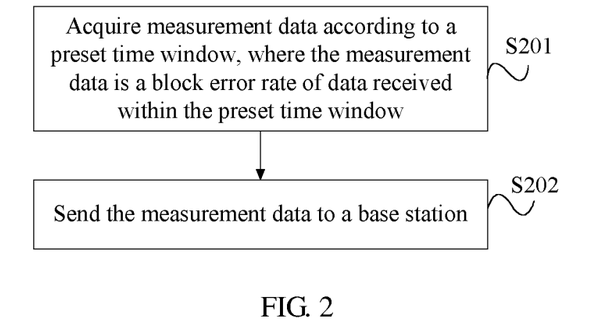
FIG. 2 is a schematic flowchart of Embodiment 2 of a method for transmitting MBSFN measurement data according to the present invention.

FIG. 2 is a schematic flowchart of Embodiment 2 of a method for transmitting MBSFN measurement data according to the present invention. This embodiment is executed by a UE. As shown in FIG. 2, the method according to this embodiment includes:

S201: Acquire measurement data according to a preset time window, where the measurement data is a block error rate of data received within the preset time window.

The preset time window is predefined duration, or duration that is set by a base station by using signaling and received by the UE.

S202: Send the measurement data to a base station.

In this embodiment, the base station optimizes a network according to the block error rate of data received within a preset time window, which can determine a change of the block error rate along with time and reflect a change of a channel along with time, so that a network side can perform network optimization more accurately according to the change of the channel along with time.

Figure 3:
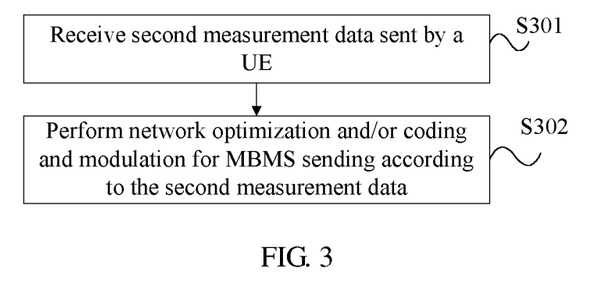
FIG. 3 is a schematic flowchart of Embodiment 3 of a method for transmitting MBSFN measurement data according to the present invention.

FIG. 3 is a schematic flowchart of Embodiment 3 of a method for transmitting MBSFN measurement data according to the present invention. This embodiment is executed by a base station. As shown in FIG. 3, the method according to this embodiment includes:

S301: Receive second measurement data sent by a UE.

The second measurement data is measurement data acquired by the UE by preprocessing acquired first measurement data, the first measurement data includes M measured values, and the M measured values are measured values of a same MBSFN measurement parameter, where M is an integer greater than or equal to 2, and a size of the second measurement data is smaller than that of the first measurement data. For a preprocessing method, reference may be made to the detailed description of the embodiment on a UE side, and details are not repeatedly described herein.

S302: Perform network optimization and/or coding and modulation for MBMS sending according to the second measurement data.

In this embodiment, a base station receives second measurement data sent by a UE, and performs network optimization according to the second measurement data; because the second measurement data is obtained after first measurement data is preprocessed, a size of the second measurement data is smaller than that of the first measurement data, thereby reducing a transmission overhead.

Figure 4:
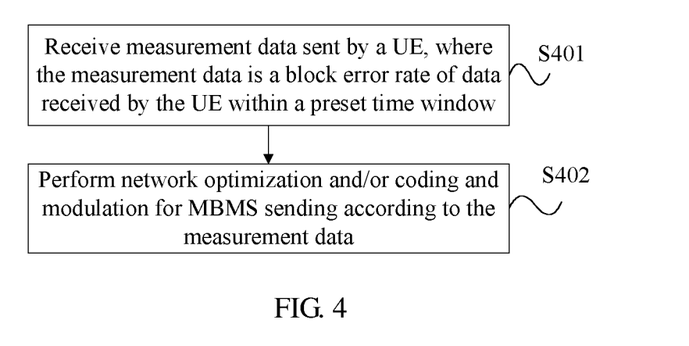
FIG. 4 is a schematic flowchart of Embodiment 4 of a method for transmitting MBSFN measurement data according to the present invention.

FIG. 4 is a schematic flowchart of Embodiment 4 of a method for transmitting MBSFN measurement data according to the present invention. This embodiment is executed by a base station. As shown in FIG. 4, the method according to this embodiment includes:

S401: Receive measurement data sent by a UE, where the measurement data is a block error rate of data received by the UE within a preset time window.

The preset time window is predefined duration, or duration that is set by a base station by using signaling and received by the UE.

S402: Perform network optimization and/or coding and modulation for MBMS sending according to the measurement data.

In this embodiment, a base station optimizes a network according to a block error rate of data received within a preset time window, which can determine a change of the block error rate along with time and reflect a change of a channel along with time, so that a network side can perform network optimization and/or coding and modulation for MBMS sending more accurately according to the change of the channel along with time.

Figure 5:
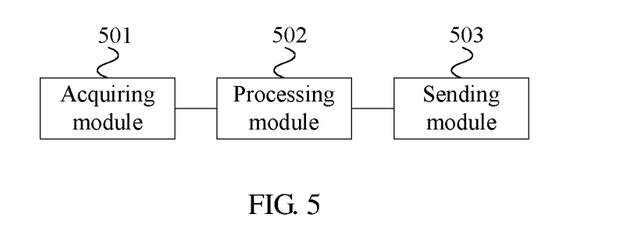
FIG. 5 is a schematic structural diagram of Embodiment 1 of an apparatus for transmitting MBSFN measurement data according to the present invention.

FIG. 5 is a schematic structural diagram of Embodiment 1 of an apparatus for transmitting MBSFN measurement data according to the present invention. The apparatus in this embodiment is deployed on a UE. The apparatus in this embodiment includes an acquiring module 501, a processing module 502, and a sending module 503, where the acquiring module 501 is configured to acquire first measurement data, where the first measurement data includes M measured values, and the M measured values are measured values of a same broadcast-multicast single-frequency network MBSFN measurement parameter, and M is an integer greater than or equal to 2; the processing module 502 is configured to preprocess the first measurement data to acquire second measurement data, where a size of the second measurement data is smaller than that of the first measurement data; and the sending module 503 is configured to send the second measurement data to a base station.

In this embodiment, the processing module 502 is specifically configured to determine one measured value of the M measured values as a first measured value; acquire M−1 differences, where the M−1 differences are differences respectively between M−1 measured values except the first measured value of the first measurement data and the first measured value; and determine the first measured value and the M−1 differences as the second measurement data.

In this embodiment, the processing module 502 is specifically configured to acquire differences between two consecutive measured values one by one according to a sequence of the M measured values, where a quantity of the differences is M−1, and a difference between two consecutive measured values is a difference acquired by subtracting a next measured value from a previous measured value or a difference acquired by subtracting a previous measured value from a next measured value; and determine, according to the sequence of the M measured values, the first measured value of the M measured values and the M−1 differences as the second measurement data.

In this embodiment, the processing module 502 is specifically configured to acquire, according to a nature of the measurement parameter, N worst measured values of the M measured values as the second measurement data, where N is an integer greater than or equal to 1 and smaller than or equal to M.

In this embodiment, the processing module 502 is specifically configured to acquire, according to a nature of the measurement parameter, an average value of N worst measured values of the M measured values as the second measurement data, where N is an integer greater than or equal to 1 and smaller than or equal to M.

In this embodiment, N is a preset value, or a value that is set by using signaling.

In this embodiment, the processing module 502 is specifically configured to determine, according to ranges of R preset intervals, a quantity of measured values in each preset interval of the M measured values, where R is an integer greater than or equal to 1; and determine the quantity of the measured values in each preset interval as the second measurement data.

In this embodiment, the processing module 502 is specifically configured to determine, according to ranges of R preset intervals, a ratio of a quantity of measured values in each preset interval of the M measured values to M; and determine the ratio of the quantity of the measured values in each preset interval to M as the second measurement data.

In this embodiment, the processing module 502 is specifically configured to determine, according to ranges of R preset intervals, an average value and/or a variance of measured values in each preset interval of the M measured values; and determine the average value and/or the variance of the measured values in each preset interval as the second measurement data.

In this embodiment, the preset intervals are intervals that are set according to a value range of the measured values.

In this embodiment, R is a preset value, or a value that is set by using signaling.

In this embodiment, the processing module 502 is specifically configured to determine an average value and/or a variance of the M measured values of the first measurement data; and determine the average value and/or the variance of the M measured values as the second measurement data.

In this embodiment, the processing module 502 is specifically configured to determine, according to W preset time windows and a time when each measured value of the M measured values is acquired, an average value and/or a variance of measured values within each preset time window, where W is an integer greater than or equal to 1; and determine the average value and/or the variance of the measured values within each preset time window as the second measurement data.

In this embodiment, the preset time window is predefined duration, or duration that is set by using signaling.

The apparatus in this embodiment may be correspondingly used to execute the technical solution of the method embodiment shown in FIG. 1; the implementation principle and technical effects thereof are similar and details are not repeatedly described herein.

Figure 6:
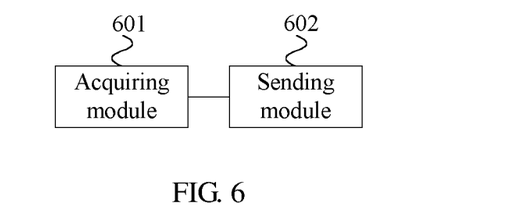
FIG. 6 is a schematic structural diagram of Embodiment 2 of an apparatus for transmitting MBSFN measurement data according to the present invention.

FIG. 6 is a schematic structural diagram of Embodiment 2 of an apparatus for transmitting MBSFN measurement data according to the present invention. The apparatus in this embodiment may be deployed on a UE. The apparatus in this embodiment includes an acquiring module 601 and a sending module 602, where the acquiring module 601 is configured to acquire measurement data according to a preset time window, where the measurement data is a block error rate of data received within the preset time window; and the sending module 602 is configured to send the measurement data to a base station, so that the base station performs network optimization and/or coding and modulation for MBMS sending according to the measurement data.

In this embodiment, the preset time window is predefined duration, or duration that is set by using signaling.

The apparatus in this embodiment may be correspondingly used to execute the technical solution of the method embodiment shown in FIG. 2; the implementation principle and technical effects thereof are similar and details are not repeatedly described herein.

Figure 7:
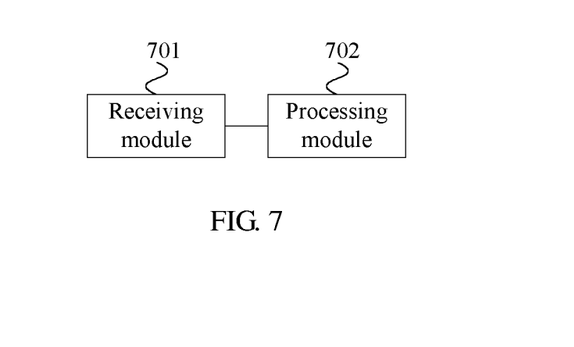
FIG. 7 is a schematic structural diagram of Embodiment 3 of an apparatus for transmitting MBSFN measurement data according to the present invention.

FIG. 7 is a schematic structural diagram of Embodiment 3 of an apparatus for transmitting MBSFN measurement data according to the present invention. The apparatus in this embodiment is deployed on a base station. The apparatus in this embodiment includes a receiving module 701 and a processing module 702, where the receiving module 701 is configured to receive second measurement data sent by a user equipment UE, where the second measurement data is measurement data acquired by the UE by preprocessing acquired first measurement data, the first measurement data includes M measured values, and the M measured values are measured values of a same broadcast-multicast single-frequency network MBSFN measurement parameter, and M is an integer greater than or equal to 2, and a size of the second measurement data is smaller than that of the first measurement data; and the processing module 702 is configured to perform network optimization and/or coding and modulation for MBMS sending according to the second measurement data.

The apparatus in this embodiment may be correspondingly used to execute the technical solution of the method embodiment shown in FIG. 3; the implementation principle and technical effects thereof are similar and details are not repeatedly described herein.

Figure 8:
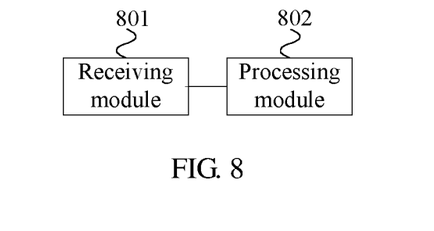
FIG. 8 is a schematic structural diagram of Embodiment 4 of an apparatus for transmitting MBSFN measurement data according to the present invention.

FIG. 8 is a schematic structural diagram of Embodiment 4 of an apparatus for transmitting MBSFN measurement data according to the present invention. The apparatus in this embodiment is deployed on a base station. The apparatus in this embodiment includes a receiving module 801 and a processing module 802, where the receiving module 801 is configured to receive measurement data sent by a UE, where the measurement data is a block error rate of data received by the UE within a preset time window, and the preset time window is predefined duration, or duration that is set by using signaling; and the processing module 802 is configured to perform network optimization and/or coding and modulation for MBMS sending according to the measurement data.

The apparatus in this embodiment may be correspondingly used to execute the technical solution of the method embodiment shown in FIG. 4; the implementation principle and technical effects thereof are similar and details are not repeatedly described herein.

Figure 9:
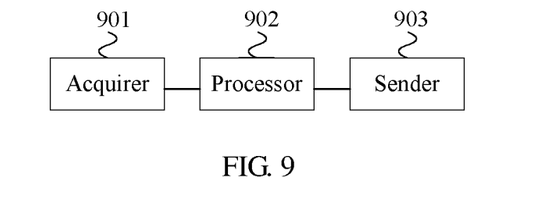
FIG. 9 is a schematic structural diagram of Embodiment 5 of an apparatus for transmitting MBSFN measurement data according to the present invention.

FIG. 9 is a schematic structural diagram of Embodiment 5 of an apparatus for transmitting MBSFN measurement data according to the present invention. The apparatus in this embodiment is deployed on a UE. The apparatus in this embodiment includes an acquirer 901, a processor 902, and a sender 903, where the acquirer 901 is configured to acquire first measurement data, where the first measurement data includes M measured values, the M measured values are measured values of a same broadcast-multicast single-frequency network MBSFN measurement parameter, and M is an integer greater than or equal to 2; the processor 902 is configured to preprocess the first measurement data to acquire second measurement data, where a size of the second measurement data is smaller than that of the first measurement data; and the sender 903 is configured to send the second measurement data to a base station.

In this embodiment, the processor 902 is specifically configured to determine one measured value of the M measured values as a first measured value; acquire M−1 differences, where the M−1 differences are differences respectively between M−1 measured values except the first measured value of the first measurement data and the first measured value; and determine the first measured value and the M−1 differences as the second measurement data.

In this embodiment, the processor 902 is specifically configured to acquire differences between two consecutive measured values one by one according to a sequence of the M measured values, where a quantity of the differences is M−1, and a difference between two consecutive measured values is a difference acquired by subtracting a next measured value from a previous measured value or a difference acquired by subtracting a previous measured value from a next measured value; and determine, according to the sequence of the M measured values, the first measured value of the M measured values and the M−1 differences as the second measurement data.

In this embodiment, the processor 902 is specifically configured to acquire, according to a nature of the measurement parameter, N worst measured values of the M measured values as the second measurement data, where N is an integer greater than or equal to 1 and smaller than or equal to M.

In this embodiment, the processor 902 is specifically configured to acquire, according to a nature of the measurement parameter, an average value of N worst measured values of the M measured values as the second measurement data, where N is an integer greater than or equal to 1 and smaller than or equal to M.

In this embodiment, N is a preset value, or a value that is set by using signaling.

In this embodiment, the processor 902 is specifically configured to determine, according to ranges of R preset intervals, a quantity of measured values in each preset interval of the M measured values, where R is an integer greater than or equal to 1; and determine the quantity of the measured values in each preset interval as the second measurement data.

In this embodiment, the processor 902 is specifically configured to determine, according to ranges of R preset intervals, a ratio of a quantity of measured values in each preset interval of the M measured values to M; and determine the ratio of the quantity of the measured values in each preset interval to M as the second measurement data.

In this embodiment, the processor 902 is specifically configured to determine, according to ranges of R preset intervals, an average value and/or a variance of measured values in each preset interval of the M measured values; and determine the average value and/or the variance of the measured values in each preset interval as the second measurement data.

In this embodiment, the preset intervals are intervals that are set according to a value range of the measured values.

In this embodiment, R is a preset value, or a value that is set by using signaling.

In this embodiment, the processor 902 is specifically configured to determine an average value and/or a variance of the M measured values of the first measurement data; and determine the average value and/or the variance of the M measured values as the second measurement data.

In this embodiment, the processor 902 is specifically configured to determine, according to W preset time windows and a time when each measured value of the M measured values is acquired, an average value and/or a variance of measured values within each preset time window, where W is an integer greater than or equal to 1; and determine the average value and/or the variance of the measured values within each preset time window as the second measurement data.

In this embodiment, the preset time window is predefined duration, or duration that is set by using signaling.

The apparatus in this embodiment may be correspondingly used to execute the technical solution of the method embodiment shown in FIG. 1; the implementation principle and technical effects thereof are similar and details are not repeatedly described herein.

Figure 10:
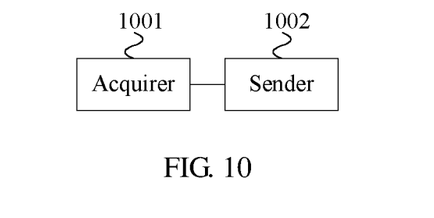
FIG. 10 is a schematic structural diagram of Embodiment 6 of an apparatus for transmitting MBSFN measurement data according to the present invention.

FIG. 10 is a schematic structural diagram of Embodiment 6 of an apparatus for transmitting MBSFN measurement data according to the present invention. The apparatus in this embodiment includes an acquirer 1001 and a sender 1002, where the acquirer 1001 is configured to acquire measurement data according to a preset time window, where the measurement data is a block error rate of data received within the preset time window; and the sender 1002 is configured to send the measurement data to a base station, so that the base station performs network optimization and/or coding and modulation for MBMS sending according to the measurement data.

In this embodiment, the preset time window is predefined duration, or duration that is set by using signaling.

The apparatus in this embodiment may be correspondingly used to execute the technical solution of the method embodiment shown in FIG. 2; the implementation principle and technical effects thereof are similar and details are not repeatedly described herein.

Figure 11:
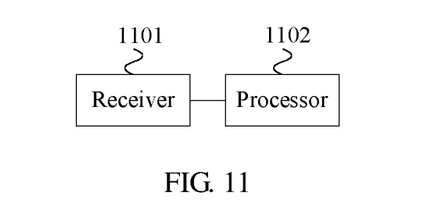
FIG. 11 is a schematic structural diagram of Embodiment 7 of an apparatus for transmitting MBSFN measurement data according to the present invention.

FIG. 11 is a schematic structural diagram of Embodiment 7 of an apparatus for transmitting MBSFN measurement data according to the present invention. The apparatus in this embodiment is deployed on a base station. The apparatus in this embodiment includes a receiver 1101 and a processor 1102, where the receiver 1101 is configured to receive second measurement data sent by a user equipment UE, where the second measurement data is measurement data acquired by the UE by preprocessing acquired first measurement data, the first measurement data includes M measured values, and the M measured values are measured values of a same broadcast-multicast single-frequency network MBSFN measurement parameter, where M is an integer greater than or equal to 2, and a size of the second measurement data is smaller than that of the first measurement data; and the processor 1102 is configured to perform network optimization and/or coding and modulation for MBMS sending according to the second measurement data.

The apparatus in this embodiment may be correspondingly used to execute the technical solution of the method embodiment shown in FIG. 3; the implementation principle and technical effects thereof are similar and details are not repeatedly described herein.

Figure 12:
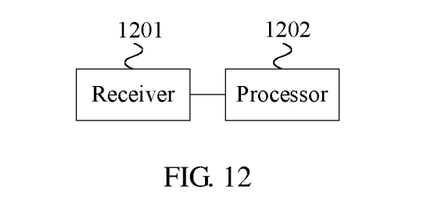
FIG. 12 is a schematic structural diagram of Embodiment 8 of an apparatus for transmitting MBSFN measurement data according to the present invention.

FIG. 12 is a schematic structural diagram of Embodiment 8 of an apparatus for transmitting MBSFN measurement data according to the present invention. The apparatus in this embodiment is deployed on a base station. The apparatus in this embodiment includes a receiver 1201 and a processor 1202, where the receiver 1201 is configured to receive measurement data sent by a UE, where the measurement data is a block error rate of data received by the UE within a preset time window, and the preset time window is predefined duration, or duration that is set by using signaling; and the processor 1202 is configured to perform network optimization and/or coding and modulation for MBMS sending according to the measurement data.

The apparatus in this embodiment may be correspondingly used to execute the technical solution of the method embodiment shown in FIG. 4; the implementation principle and technical effects thereof are similar and details are not repeatedly described herein.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
   acquiring, by a user equipment, measurement data according to a preset time window, wherein the measurement data is a block error rate of data received within the preset time window, and the measurement data is a factor for coding and modulation for broadcast multicast service (MBMS); and
   sending, by the user equipment, the measurement data to a base station.

2. The method according to claim 1, wherein the preset time window is a predefined duration.

3. The method according to claim 2, wherein the predefined time window is set by the base station.

4. The method according to claim 1, wherein the preset time window is duration that is set by signaling.

5. The method according to claim 4, wherein the signaling is received by the user equipment from the base station.

6. The method according to claim 1, wherein the measurement data is a block error rate of broadcast-multicast single-frequency network measurement data received within the preset time window.

7. The method according to claim 1, wherein the measurement data is a block error rate of multicast data received within the preset time window.

8. The method according to claim 1, wherein the block error rate of the data received within the preset time window corresponds to a modulation and coding scheme (MCS).

9. A method, comprising:
   receiving, by a base station, measurement data from a terminal device, wherein the measurement data is a block error rate of data sent to the terminal device within a preset time window; and
   performing, by the base station, coding and modulation for broadcast multicast service (MBMS) according to the measurement data.

10. The method according to claim 9, wherein the preset time window is a predefined duration.

11. The method according to claim 9, wherein the preset time window is duration that is set by signaling.

12. A terminal device, comprising:
   a non-transitory storage medium including executable instructions; and
   a processor;
   wherein the executable instructions, when executed by the processor, cause the terminal device to:
      acquire measurement data according to a preset time window, wherein the measurement data is a block error rate of data received within the preset time window, and the measurement data is a factor for coding and modulation for broadcast multicast service (MBMS); and
      send the measurement data to a base station.

13. The terminal device according to claim 12, wherein the preset time window is a predefined duration.

14. The terminal device according to claim 12, wherein the preset time window is duration that is set by signaling.

15. A base station, comprising:
   a non-transitory storage medium including executable instructions; and
   a processor;
   wherein the executable instructions, when executed by the processor, cause the base station to:
      receive measurement data from a terminal device, wherein the measurement data is a block error rate of data sent to the terminal device within a preset time window; and
      perform coding and modulation for broadcast multicast service (MBMS) according to the measurement data.

16. The base station according to claim 15, wherein the preset time window is a predefined duration.

17. The base station according to claim 15, wherein the preset time window is duration that is set by signaling.

18. A communication system, comprising:
   a user equipment, configured to:
      acquire measurement data according to a preset time window, wherein the measurement data is a block error rate of data received by the user equipment within the preset time window, and the measurement data is a factor for coding and modulation for broadcast multicast service (MBMS); and
      send the measurement data to a base station;
   the base station, configured to:
      receive the measurement data from the user equipment;
      perform coding and modulation for broadcast multicast service (MBMS) according to the measurement data.

* * * * *